[54] FOCUS INITIALIZATION SYSTEM FOR OPTICAL RECORDING

[75] Inventor: Christopher Miller, Colorado Springs, Colo.

[73] Assignee: Magnetic Peripherals Inc., Minneapolis, Minn.

[21] Appl. No.: 336,245

[22] Filed: Dec. 31, 1981

[51] Int. Cl.³ .............................................. G11B 7/00
[52] U.S. Cl. ........................................ 369/45; 369/46; 250/201
[58] Field of Search ...................... 369/45, 46, 94, 124, 369/44; 201/201, 204

[56] References Cited

U.S. PATENT DOCUMENTS

| | | | |
|---|---|---|---|
| 3,932,700 | 1/1976 | Snopko | 369/45 |
| 3,952,191 | 4/1976 | Tinet | 250/201 |
| 3,974,327 | 8/1976 | Van Dijk | 178/6.6 R |
| 4,123,652 | 10/1978 | Bouwhuis | 250/204 |
| 4,128,847 | 12/1978 | Roullet et al. | 369/45 |
| 4,243,848 | 1/1981 | Utsumi | 369/45 |
| 4,280,215 | 7/1981 | Okano | 369/45 |
| 4,286,147 | 8/1981 | Tsuboi et al. | 250/201 |
| 4,337,532 | 6/1982 | Oprandi et al. | 369/45 |

FOREIGN PATENT DOCUMENTS 55-38639  3/1980  Japan ...................... 369/45

Primary Examiner—Donald E. McElheny, Jr.
Attorney, Agent, or Firm—William J. McGinnis; Joseph A. Genovese

[57] ABSTRACT

A focus initialization system is provided for optical data recording of the type in which an objective lens relatively near to the optical recording media is moved back and forth in comparatively small excursions to maintain focus for the read beam and write beam on the media. This system initializes or loads a conventional focusing system by starting the objective lens at a position at the far end of its travel limit, preferably, with the objective lens furthest from the optical media. The objective lens moves slowly towards the optical media while the system operates to detect when a near focus condition exists. Known focusing detection systems produce a bipolar output voltage having a peak on either side of the exact focus point when a near to focus condition is achieved. The present system detects when the objective lens is at a near to focus condition in the range between bipolar voltage peaks on either side of the focused point. When the objective lens is near to focus where the known focusing system can maintain focus, the present system switches on the known focusing system. The present system monitors the focus condition and if a far out of focus condition occurs, waits a short time interval before activating a warning indication. Also, the present system waits a short time interval when a near to focus condition exists before activating the known focusing system in order to make sure that the near to focus condition is stable.

8 Claims, 9 Drawing Figures

LINEAR REGION = (IN BAND) (A+B) + (IN BAND) (C+D)

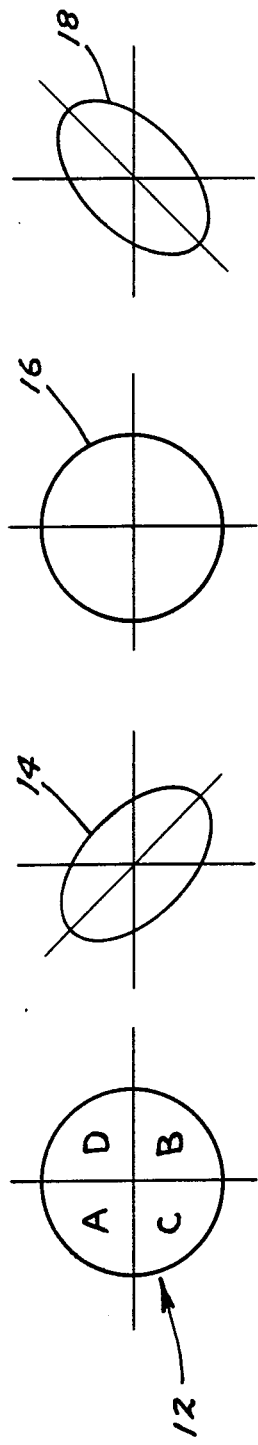
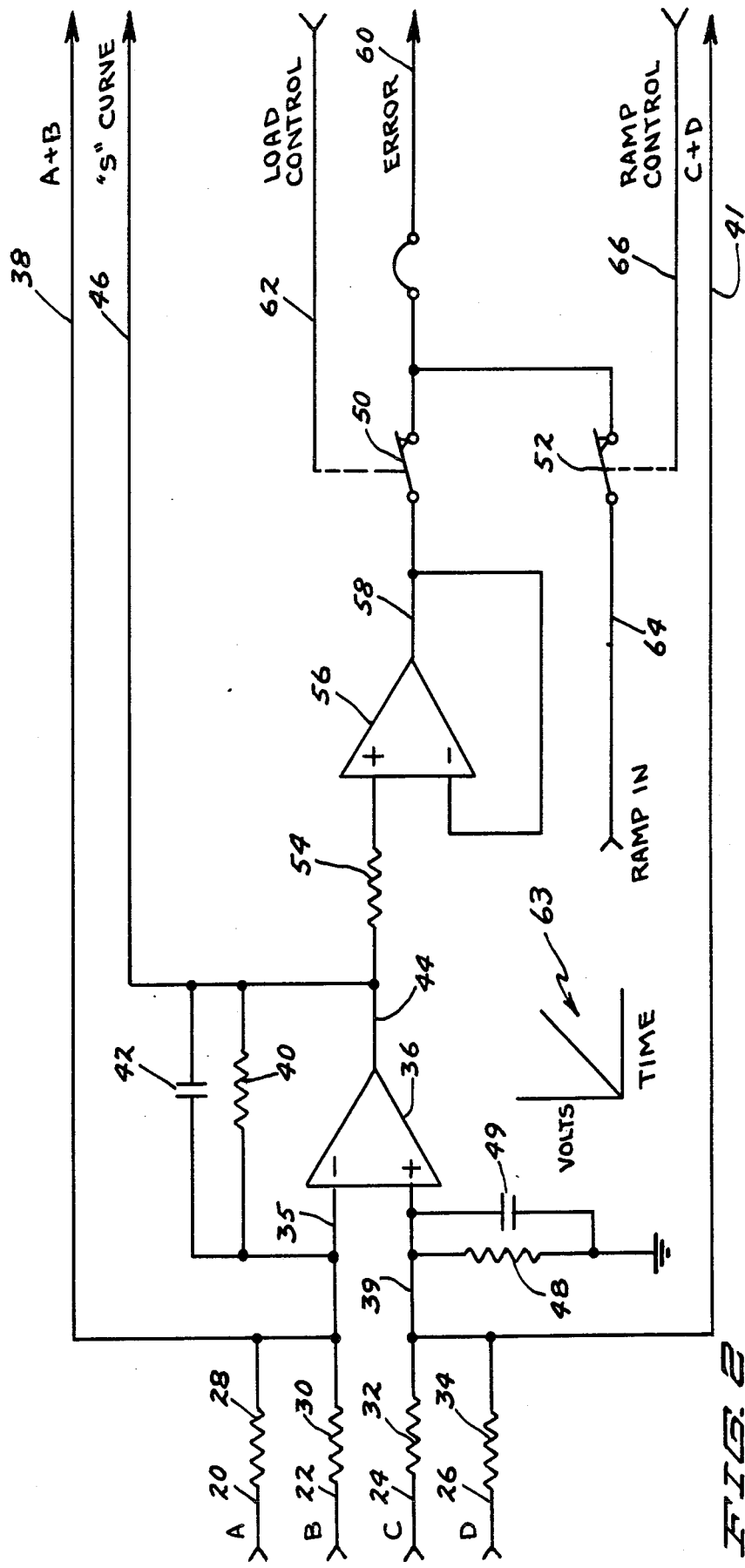

FOCUS INITIALIZATION SYSTEM FOR OPTICAL RECORDING

BACKGROUND OF THE INVENTION

The present invention relates to optical focusing control systems for optical recording systems. In particular, the present invention relates to a focusing intialization or loading system to be activated when an opticl recording system is first turned on or must be reactivated when it is in an out of focus condition for some reason. The present invention may use as an input the analog signals derived from known focusing systems which are designed to operate an objective lens focusing system in an optical recording system when a near focus condition has already been achieved. However, such systems which operate from a given near focus condition cannot achieve that near focus condition from a condition in which the objective lens is far from a focused condition. Thus, an object of the present invention is to provide a system to drive the objective focusing lens in an optical recording system to a sufficiently near focus condition that a near focus control system can take over driving the objective lens element.

Known to Applicant is U.S. Pat. No. 3,974,327 which relates to a focusing system for an optical data recording device. The system described in the patent relates to a system in which the objective lens is initially moved from a position furthrest away from the recording media towards the media and towards a focused position. When a near focus condition is detected, the patent is directed towards developing a control system to protect the objective lens from crashing into the media by immediately driving it away from the media while leaving it in a near focused condition. This patent does not anticipate the logic of the present invention which detects a near focus condition and activates a near focused automatic control system while maintaining a protective watch on the focusing function.

A near focus control system is shown in U.S. Pat. No. 4,123,652. That patent describes a system in which four focusing elements are arranged in a square or quadrature system to detect a focusing light spot and to produce four separate output signals. The detectors may be diode light detectors of a known type. The system employed in that patent is an astigmatic focusing system. The patent shows that the output signals of the various detectors may be combined in a particular fashion to produce a signal suitable for controlling a focusing system in a near focused condition. Of course, the same system using the detectors will continuously produce an output signal as long as light is detected on the detecting area.

The system as described in that patent is characterized in that the system will produce a zero level output signal when in a far out of focus condition either too far from the recording media or to too close to the recording media as well as at an exact focused condition. In a near to focus condition, the outputs of the detectors are combined in such a fashion as to produce a bipolar signal when the objective lens is in a near to focused condition on either side of the focus condition. The Figs. in the referenced patent as well as the text of the patent describes the shape of the light impinging on the detector area in these near to focus conditions as well as the output signal combinations to be used with the detectors in order to produce an output signal as described.

Other focusing systems may exist and may be developed with which the present focus initialization system may be used. Such systems may be used with a quadrature detector in which the focusing system produces the same type of output signal as described herein in which a bipolar signal has peaks at near to focus conditions. A two detector system may be used in astigmatic or other focusing systems to produce a bipolar output signal. Other systems may exist in which such an output signal may be generated using other types of detector patterns. The present invention is not limited as to the focusing system or as to the detection system used. The present invention will work with any focusing system which may be configured to provide the appropriate variable output signal having a bipolar relationship to the near to focus and focused conditions.

SUMMARY OF THE INVENTION

The present invention is a focusing system for initializing or loading an optical recording device having a near focusing system producing an output signal indicative of the focused or near focused condition of the system. The present invention provides logic and control circuitry to bring the objective lens from a far out of focus start up condition to the point where the focusing system is in a near to focus condition and the regular focusing control or servo circuitry can handle the focusing requirements. The present invention provides logic to detect this near to focus condition and commence operation of the regular focusing control system. During operation in the focused condition, the present invention provides a monitoring function, which, if the system should go to an out of focus condition, will reinitialize the focusing procedure or provide a warning that an out of focus condition exists, as desired. The present system will allow the out of focus condition to continue for a brief period of time, selectable as conditions require, before starting the reinitialization or the alarm or warning process. Similarly, in obtaining an initial near to focus condition for the regular focusing control system, the present invention allows a short time interval to pass, allowing the system to achieve stability in the near to focus condition, before initializing the regular focus control system.

U.S. Pat. No. 4,123,652 previously referenced, shows how a system of four light detecting elements, such as diodes, may be used to generate what may be referred to as an "S" curve signal representing a combination of the output values of all four detectors. In addition, these detectors may be used to produce other output signal combinations such as A+B and C+D.

The present invention uses three analog signal inputs representing the "S" curve signal, the A+B detector signals and the C+D detector signals. These signals may be generated by means shown in the patent or other appropriate means. These signals are each separately compared with reference signal levels and three separate logic outputs are generated. These three logic outputs are then used to detect a condition near to focus on the "S" curve where the logic also requires that this near to focus condition is within the "S" curve and not merely a signal value outside the "S" curve. Once a near to focus condition is detected, a short time interval is allowed to pass and then the standard servo or near focus control system is activated to control focusing in the regular manner. The present system, however, continuously monitors the previously described analog signals generated in the focusing system. If an out of focus condition is detected, a short time interval is allowed to pass so that if the condition is transient and removes itself, no disturbance of the function occurs. However, after the time interval elapses and if a far out of focus condition still exists, then a warning may be issued and all use of the optical recording function will cease. The system may be designed to reinitialize itself if desired by the operator.

IN THE FIGURES:

FIG. 1A shows a quadrature pattern of four light detectors for astigmatic focusing.

FIG. 1B shows the astigmatic focusing light pattern on the light detectors for a slightly out of focus condition where the objective lens is too close to the media.

FIG. 1C shows the light pattern on the light detectors when in focus.

FIG. 1D shows the out of focus light pattern on the light detectors when the objective lens is slightly out of focus and too far away from the media.

FIG. 2 shows the front end circuit of the focusing servo system where light detector inputs are supplied to the servo circuit and in which an "S" curve signal is developed for focusing logic.

Figure 4A:
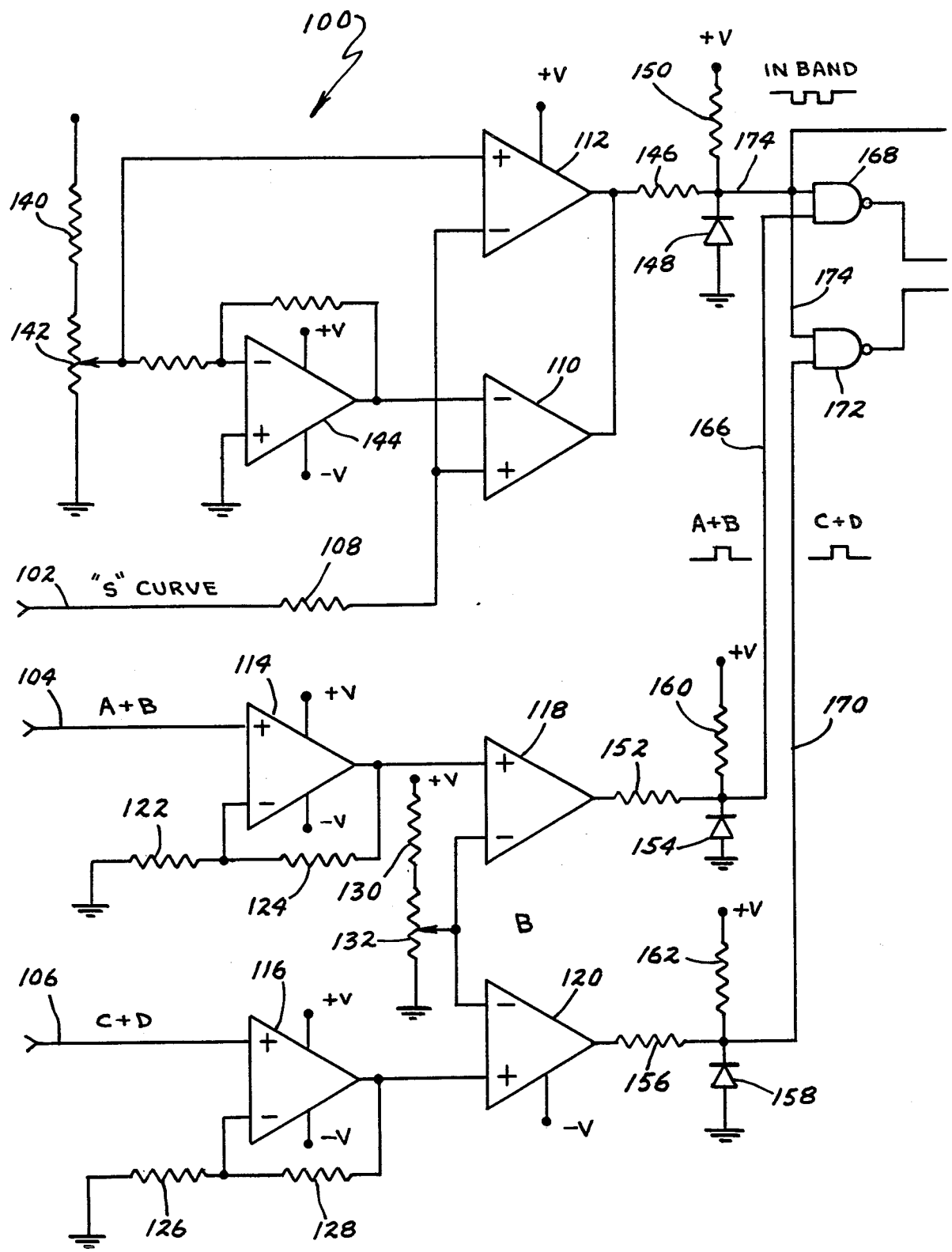
Figure 4B:
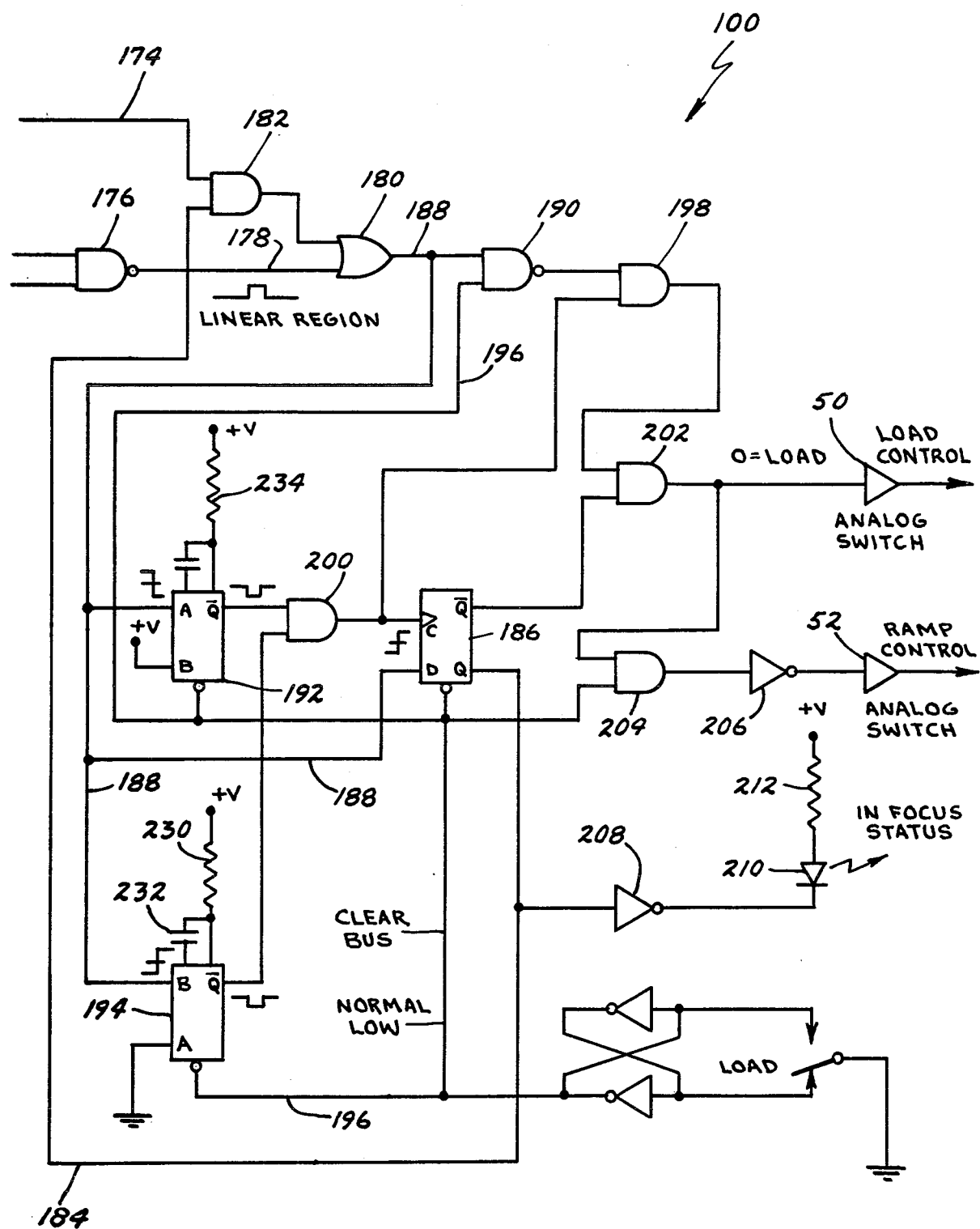

FIGS. 4A and 4B, placed in left to right relationship, shown a focus load logic system according to the present invention.

Figure 5:
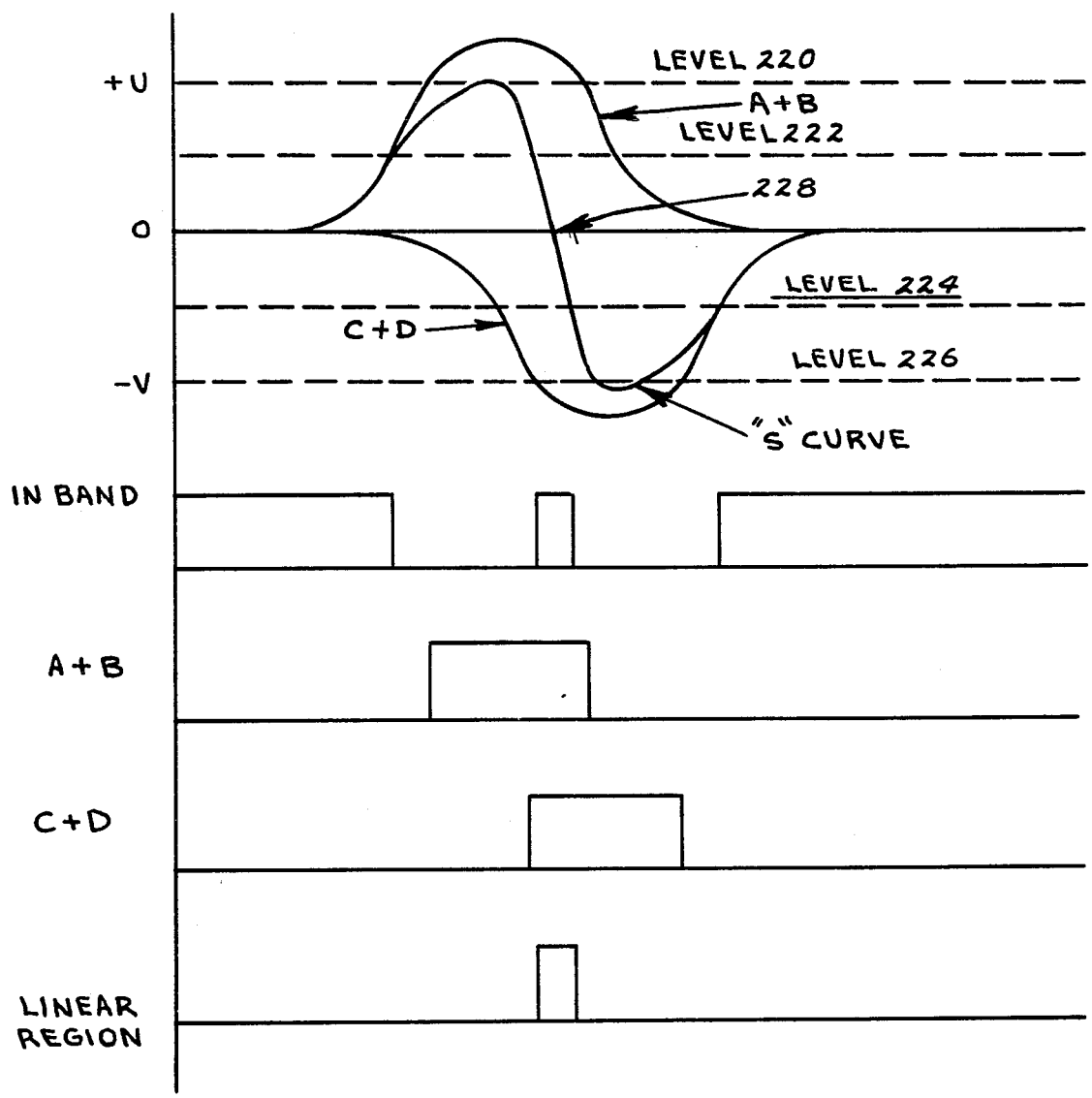

FIG. 5 shows the signal values at various points in the system of FIGS. 4A and 4B.

DESCRIPTION OF THE PREFERRED EMBODIMENT

Referring now to FIG. 1A, a quadrature detector pattern for use in optical recording is shown in which a pattern of light detectors 12 is arranged to cover the four quadrants of an area in which a light beam would impinge after reflection from the media. The light detectors may be conventional light detecting diodes. The four quadrants are labeled A, B, C and D where the light detector is assigned to that area with that letter and this terminology is used consistently in this specification.

Referring now to FIG. 1B, the astigmatic light pattern 14 is shown for the case in which the objective lens is too close to the recording media when a system of astigmatic focusing is used similar to that described in U.S. Pat. No. 3,974,327.

Referring now to FIG. 1C, the light pattern 16 represents the generally circular light pattern resulting when the objective lens is essentially in a focus condition on the recording media.

Finally, referring now to FIG. 1D, the astigmatic light pattern 18 is shown for the condition in which the objective lens is out of focus and too far away from the recording media. The light patterns represented in FIGS. 1B, and 1D, 14 and 18, respectively, represent conditions where the out of focus position of the objective lens is still in a close to focus condition. When the objective lens is far out of focus, either too close to the media or too far away from the media, a generally uniform light pattern is produced across the quadrature detector system shown at 12 in FIG. 1A, although the light intensity of that pattern is less than the light intensity of the in focus pattern 16 shown in FIG. 1C.

Referring now to FIG. 2, the input signals from the light detecting elements arranged in the quadrature pattern shown in FIG. 1A are supplied as inputs on lines 20, 22, 24 and 26, where the lines are respectively associated with the light detector elements A, B, C, and D. Each input line has associated with it a load resistance. Resistances 28, 30, 32 and 34 are associated with input lines 20, 22, 24 and 26, respectively.

The A and B inputs on lines 20 and 22, respectively, are summed together as the negative input 35 to operational amplifier 36. These summed signals are also provided as an output line 38 to be used elsewhere in the circuit, as will be decribed. The C and D input lines are summed together as the positive input 38 for operational amplifier 36. The summed C=D inputs to amplifier 36 are also provided as an output line 41 to be used elsewhere in the circuit as will be described later.

A simple filter consisting of a resistance 40 and a capacitance 42 is associated in a feedback loop from the negative input 35 to the output 44 of operational amplifier 36. The output 44 of amplifier 36 is also provided as the "S" curve output of the system on line 46. Another simple filter consisting of a resistance 48 and a capacitance 49 is connected from the positive input of amplifier 36 to ground.

The output 44 of amplifier 36 is connected through a resistance 54 to the positive input of another operational amplifier 56. The output 58 of operational amplifier 56 is connected through a normally open analog switch 50 to provide the output error signal 60 to drive the regular focusing servo control loop. Normally open switch 50 is controlled by a LOAD CONTROL signal provided on line 62. A RAMP IN signal is provided on line 64 from an external source. The RAMP IN signal is a progressively rising voltage with time signal for progressively driving the objective lens focusing system from its farthest away from the media position towards the media to initiate a focusing initialization cycle. This RAMP IN signal may be generated in a number of well-known ways and is shown symbolically at 63. The RAMP IN signal is connected through a normally closed switch 52, shown symbolically, to a connection with the output error control signal line 60. The normally closed analog switch 52 is controlled by an input RAMP CONTROL signal on line 66. The switches 50 and 52 are analog switches and are shown in greater detail on FIG. 4 in which the system of the present invention is described.

Figure 3:
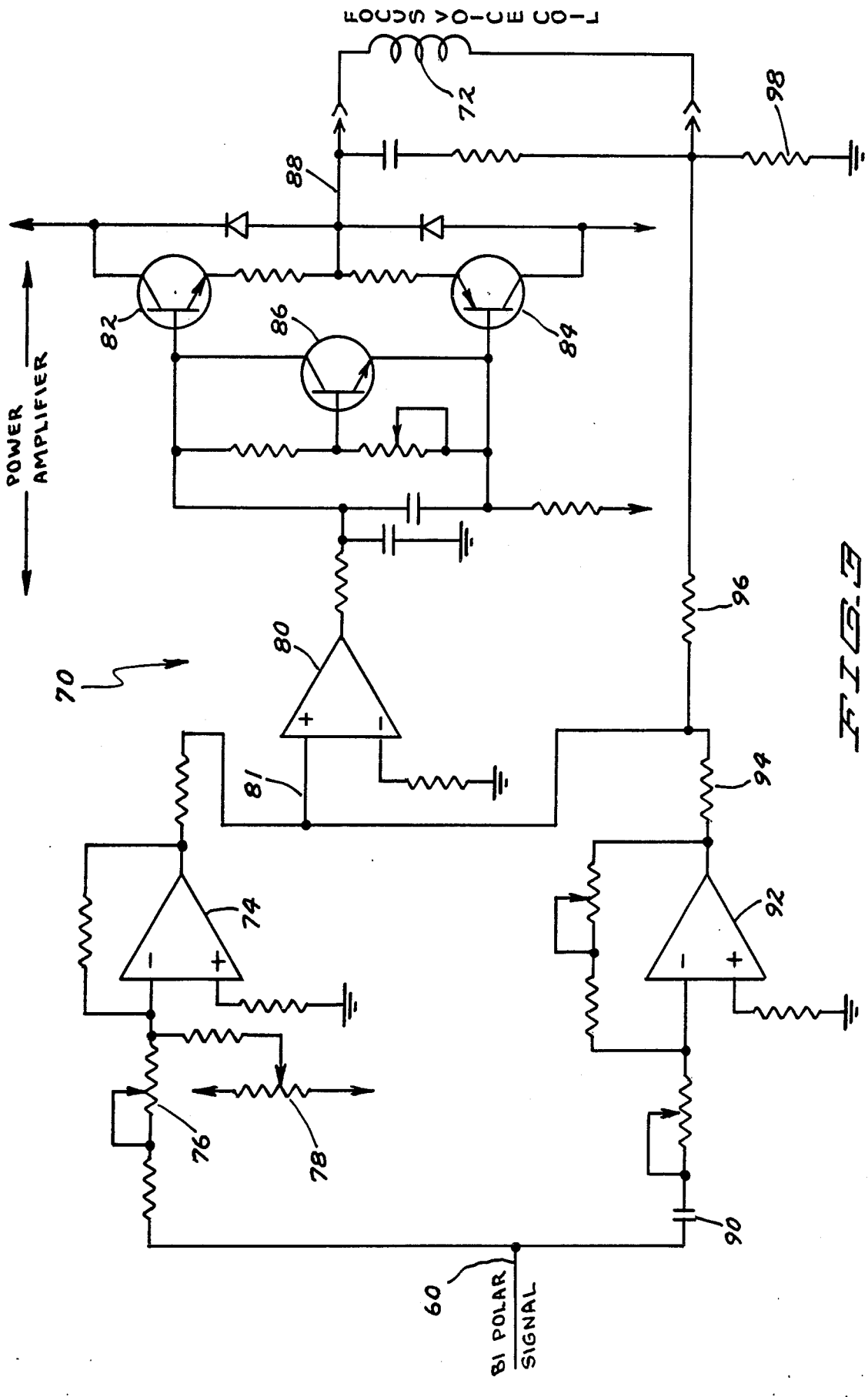
FIG. 3 shows the focusing servo drive mechanism for driving the objective lens voice coil where the "S" curve signal is amplified to drive the voice coil.

Referring now to FIG. 3, an appropriate system 70 is shown for developing an output drive signal for an objective lens focus voice coil 72 from the input error signal 60 as previously described in connection with FIG. 2. The present system would, for example, be comprised of an amplifier 74 which may have a gain control 76 and an offset bias control 78 for establishing the position of the objective lens at what is to be taken as the center point in connection with the error control input. The output from amplifier 74 is connected as a positive input to amplifier 80 which is used to drive a power amplifier circuit comprised of transistors 82 and 84 in a push-pull arrangement where transistor 86 operates as the drive transistor. The output of the power amplifier circuit is provided on line 88 as one connection to focus voice coil 72.

In addition, the input error signal 60 is connected through capacitance 90 to another amplifier 92. The output of amplifier 92 is connected through a resistance 94 and summed with the output from amplifier 74 at the positive input 81 of amplifier 80. These summed signals are also supplied for the feedback signal through resistance 96 from the other connection of voice coil 72. The amount of this feedback is controlled by resistance 96 and the resistance 98 which connects the lower end of the focus voice coil 72 to ground from output 88 of the power amplifier transistors 82 and 84.

Referring now to FIGS. 4A and 4B in which the focus initialization system 100 of the present invention is shown, the input "S" curve signal 46 shown in FIG. 2 is supplied on input line 102. The A+B signal 38 from FIG. 2 is supplied on input line 104 and the C+D signal 41 is supplied on input line 106.

Input line 102, shown in FIG. 4A, is connected through a resistance 108 to the plus input of comparator 110 and the minus input comparator 112. The A+B signal on line 104 is connected to the positive input of amplifier 114 and the input C+D signal on line 106 is connected to the positive input of amplifier 116. The output of amplifier 114 is connected to the positive input of comparator 118 while the output of amplifier 116 is connected to the positive input of comparator 120. Amplifiers 114 and 116 are operating as unity gain buffers to isolate the logic circuit from the servo input circuit as shown in FIG. 2.

Resistances 122 and 124 operate to bias amplifier 114 and resistances 126 and 128 operate to bias amplifier 116. A variable voltage divider circuit consisting of resistance 130 and variable resistance 132 is provided to determine a reference direct current input for the negative inputs of comparators 118 and 120. The purpose of this direct current reference input is to provide a threshold reference as will be explained later.

Fixed resistance 140 and variable resistance 142 operate as a voltage divider network to provide an input reference voltage to amplifier 144. This input reference voltage is provided to the negative input of amplifier 144 so that it operates as an inverter of that reference voltage. The inverted reference voltage output is connected to the negative input of comparator 110. The reference voltage output from variable resistance 142 is connected to the positive input of comparator 112. The negative input of comparator 112 is connected to the "S" curve input from line 102.

The outputs of comparators 110 and 112 are connected together in what constitutes a wired OR circuit configuration. This OR output is connected through resistance 146 to a diode 148 which receives an input bias voltage through resistance 150. The output of this node is a TTL compatible logic level voltage. Similarly, the outputs of comparators 118 and 120 are connected through resistances 152 to diode 154 and resistance 156 to diode 158, respectively, to also generate TTL compatible logic level outputs. Resistances 160 and 162 provide the bias voltage for diodes 154 and 158, respectively.

The output of comparator 118, as converted to a TTL logic compatible level, is provided on line 166 as an input to NAND gate 168. The TTL logic level developed from comparator 120 is provided on line 170 as an input to NAND gate 172. The TTL logic level compatible signal from comparators 110 and 112 is provided on line 174 to the other input of both NAND gates 168 and 172. The outputs of NAND gates 168 and 172 provide both inputs to NAND gate 176 shown on FIG. 4B.

The output of NAND gate 176 is provided on line 178 as one input to OR gate 180. This output of NAND gate 176 on line 178 is called the "linear region" output and is important to an understanding of the present invention as will be described later. Line 74 carrying the logic level output from comparators 110 and 112 is also provided as one input to AND gate 182.

The other input to AND gate 182 is provided on line 184, which connects a Q output of D type flip-flop 186 as will be explained later. The output of AND gate 182 provides the second input to OR gate 180. The output of OR gate 180 is provided on line 188 as an input to NAND gate 190. The output of OR gate 180 on line 188 is also provided as the A input to one-shot 192. The A input to a one-shot is a negative edge trigger input. The output of OR gate 180 on line 188 is also provided as the B input to one-shot 194. The B input to the one-shot is a positive edge trigger input. Line 188 also goes to the D input of D type flip-flop 186.

The other input to NAND gate 190 is from the clear bus 196. The clear bus is normally low at times when the focus load logic circuit is not operating and the normal servo loop control system of the objective lens focusing system is operating. The focus load logic circuit operates only during the focus range loading time period and at this time, the clear bus goes high to allow the circuit to operate.

The output of NAND gate 190 is connected as an input to AND gate 198. The other input to AND gate 198 is from the output of AND gate 200. One input to AND gate 200 comes from the Q output of one-shot 192. The other input to AND gate 200 comes from the Q output of one-shot 194. The output of AND gate 200 is also connected to the clock input of D type flip-flop 186. This clock input, however, does not mean that the focus load logic circuit is operating on a clock time interval or is clock dependent. The reason for this connection of the output of AND gate 200 to the clock input of D type flip-flop 186 will be explained in detail later.

The output of AND gate 198 is connected to one input of AND gate 202. The other input to AND gate 202 is the Q output of D type flip-flop 186. The output of AND gate 202 is connected to control analog switch 50 which is the load control switch shown in FIG. 2. The output of AND gate 202 is also connected as one input to AND gate 204. The other input to AND gate 204 is from the clear bus 196. The output of AND gate 204 is connected through inverter 206 to control analog switch 52 which is the ramp control switch shown in FIG. 2. The Q output of D type flip-flop 186, as has been previously described, is connected through line 184 as one input to AND gate 182. The Q output of D type flip-flop 186 is also connected through inverter 208 to control LED 210 to represent a status display to the operator of the system. Load resistor 212 is connected to a voltage source for LED 210. The Q output of D type flip-flop 186, as has been previously described, is line 184 which is also connected as one input to AND gate 182.

The focus load logic system or focus initialization system according to the present invention requires three inputs and generates two outputs. The inputs are the signals on lines 102, 104 and 106 and the outputs drive analog switches 50 and 52. Input 104 is the A+B line. It is created by adding the signals from diodes A and B. Input 106 is the C+D input line and is created by adding the signals from diodes C+D. The "S" curve is created by substracting the C+D input from the A+B input. An inverse "S" curve signal would also be generated and used to operate a system according to the present invention. The combination of amplifier 144, comparator 110 and comparator 112 and the resistor divider network created by resistors 142 and 140 create a logic window between levels 222 and and level 224 as shown in FIG. 5. This signal is made into a TTL compatible signal on line 174 and is called the "in band" signal. The combination of amplifier 114 and comparator 118 creates a TTL level corresponding to level 220 as shown in FIG. 5. Amplifier 116 and comparator 120 create a TTL level corresponding to level 226 as shown in FIG. 5. Level 220 and level 226 are designed to qualify levels 222 and 224. The reason for this is that levels 222 and 224 can exist in regions which are far out of focus. Level 220 and level 226 must both be high in order for the "in band" signal i.e., level 222 and 224 to be valid. The "in band" signal can be high when the objective lens is far away from focus in either direction but it is also high when the objective lens is very close to focus. Therefore, since it is desired to know when in focus or when the head is close to focus is a true condition, then the signals A+B and C+D are required to indicate when the "in band" signal is in fact indicating that the head is near focus as opposed to being far away from focus.

NAND gates 168, 172 and 176 provide this qualifying circuitry. When the "in band" signal and the A+B signal are both high, the output of NAND gate 168 is low. When the "in band" signal and the C+D input are both high, the output of NAND gate 172 is low. NAND gate 176 will be high when either NAND gate 168 is low or NAND gate 172 is low. This high output is an indication of the "linear region" signal. The "linear region" is the portion of the "S" curve which goes through zero and is indicated at 228 in FIG. 5. It is also that portion of the "S" curve which is between levels 222 and 224. This region is the region in which the normal focus servo loop should be closed such that a servo system will begin following the optical disk and maintaining a focus condition. When the "linear region" signal is true and the load control signal is also true, the result is a control signal that closes analog switch 50. This results in closing the servo loop and begins closed loop focused operation. The rising edge of the "linear region" signal also starts one-shot 194 into a timing condition at the end of a short time period. At the end of that time period, the linear region line is sampled by D type flip-flop 186.

This sampling is to determine if the servo focusing system is still within the linear region thus indicating that the head is in fact still in focus or is beginning to remain in focus with the disk.

The purpose of one-shot 194 and D type flip-flop 186 is to provide a delay status to a host controller. This means that one-shot 194 allows for a settling time of the servo system before an in focus status signal is sent out. This status cushion is accomplished by applying the Q output of one-shot 194 through AND gate 200 which in turn is used as an edge trigger to D type flip-flop 186. Once the one-shot 194 has timed out, the rising edge of the $\bar{Q}$ signal clocks D type flip-flop 186. When flip-flop 186 is clocked, the level on the D input, which is line 188 from OR gate 180, is transferred to the outputs Q and $\bar{Q}$. If that level is a one, when one-shot 194 times out, then an in focus condition exists and an in focus status signal is sent out through inverter 208. Also, the D type flip-flop 186 output $\bar{Q}$ is sent to AND gate 202 to maintain a loaded or locked condition. If, however, line 188 is a zero when one-shot 194 times out, then there is no in focus condition and the process of focusing the objective lens must be reissued. Once in focus, the output from flip-flop 186 is sent to AND gate 182 on line 184. This input along with the "in band" input going to AND gate 182 goes through OR gate 180 which will maintain an in focus condition because, once in focus, the A+B and C+D logic lines go false. In this state, the load control logic will continue to keep the focusing servo loop closed provided that the "in band" signal remains a one. This signal remaining in the one state indicates that the focusing servo loop is still in a focused condition.

The only way for this circuitry to change from the system loaded condition is if the "in band" signal goes to a zero indicating that the objective lens is no longer in focus. If "in band" goes to a low, one-shot 192 is triggered. At the end of its delay time period, the rising edge of the $\bar{Q}$ output of one-shot 192 again, or also, clocks D type flip-flop 186. When flip-flop 186 is clocked, the D input of this flip-flop must be back to a one condition. If so, then no change of status is initiated; i.e., the focusing servo loop has recovered and an in focus condition still exists. However if at the end of the one-shot 192 time period, the servo loop has not recovered and is still out of focus, line 188 will be a zero indicating an out of focus condition. At that time, an out of focus status signal is transferred to the output of flip-flop 186 indicating an out of focus condition for too long a period of time. At this time the host system must initiate a new load command.

Referring now to FIG. 5, levels 222 and 224 are established by the resistor divider network created by resistors 140 and 142 on line 174. However this direct current level will be or could be determined by another piece of circuitry called an automatic gain control which is looking at or referencing the laser light intensity on the detector array 12. Level 220 and level 226 are established by the resistor network created by resisters 130 and 132. These levels could also be created by an automatic gain control circuit which is looking at or referencing laser light intensity. These two automatic gain control circuits would then make the focus load logic function independent of absolute light level since light level raises and lowers the magnitude of the A+B and the C+D and the "S" curve. Thus the "S" curve could be proportioned to relative light levels.

The time interval of one-shot 194 is established by resistance 230 and capacitance 232. The time period of one-shot 192 is established by resistance 234 and capacitance 236. The values for both one-shots are roughly the same with resistances 230 and 234 being approximatelly one hundred thousand ohms and the values of the capacitances 232 and 236 being approximately 0.01 microfared. These values establish a time period of approximately one millisecond. Other values of approximately this time period may be used. The criteria for establishing the time period is how long a time period is acceptable during which the system may be out of focus before corrective action is taken and the controller is notified that no more data should be written or read. That function of determining how long the system can be out of focus before calling for help is determined by one-shot 192. The time period and criteria for determining the function of one shot 194 is how long the system must be in focus before announcing that the system is operational and closing the servo loop. That time period is established by one-shot 194 and approximately one millisecond appears to be a satisfactory time magnitude for establishing that function.

What is claimed is:

1. A focusing initialization control system for an optical recording device having a movable objective lens disposed relatively near the recording media and the movement of said objective lens is controlled by a regular operation focusing control system having light detector elements in which said focusing initialization system is comprised of:

first signal receiving means for receiving as an input an "S" curve bipolar analog signal having peaks at near to focus conditions and a predetermined linear region between the peaks, said "S" curve signal being generated from the outputs of said light detector elements, second signal receiving means for receiving as an input an A+B analog detector element signal, third signal receiving means for receiving as an input a C+D analog detector element signal, first and second comparator means connected with said first signal receiving means, said first comparator means determining that said input "S" curve signal is less than a certain predetermined value and said second comparator means determining that said "S" curve signal is greater than a predetermined value, said first and second comparator means having their outputs connected together in a wired OR circuit to produce a first logic output signal, third comparator means connected with said second signal receiving means for producing an output logic signal indicative that said input A+B signal is within a predetermined range, said third comparator means producing a second logic output signal, a fourth comparator means connected with said third signal receiving means for determining that said C+D input signal is within a predetermined range, said fourth comparator means a third logic output signal, logic means for combining said first, second and third logic output signals to produce a fourth logic signal indicative that said objective lens is within the focusing region of the linear portion of said "S" curve signal, where said logic means requires said "S" curve input signal to be within predetermined limits and requires said C+D signal and said A+B signal to be within predetermined limits, and control means responsive to said fourth logic signal from said logic means for controlling said regular focusing systems to be on when in focusing range.

2. The system of claim 1 and further comprising
first timing means connected to receive a signal from said logic means and to provide an output signal to said control means for allowing said objective lens to be within regular focusing range for a predetermined time before activating said regular focusing means.

3. The system of claim 2 and further comprising second timing means connected to receive a signal from said logic means and to provide an output signal to said control means for allowing said objective lens to be outside of regular focusing range for a predetermined time before deactivating said regular focusing means.

4. The system of claim 1 wherein said logic means is comprised of first gate means receiving as a first input said first logic signal and as a second input said second logic signal, second gate means receiving as a first input said first logic signal and as a second input said third logic signal, third gate means receiving as a first input the output of said first gate means and as a second input the output of said second gate means, said third gate means producing as an output said fourth logic signal, wherein said first, second and third gates perform a logical NAND function.

5. A focusing initialization control system for an optical recording device having a movable objective lens disposed relatively near the recording media and the movement of said objective lens is controlled by a normal operation near focusing control system having light detector elements in which said focusing initialization system is comprised of:

first signal receiving means for receiving as an input a first analog detector element signal, representative of a first light detection indication in connection with focusing, second signal receiving means for receiving as an input a second analog detector element signal, representative of a second light detection indication in connection with focusing, third signal receiving means for receiving as an input an "S" curve bipolar analog signal having peaks at near to focus conditions and a predetermined linear region between the peaks, said "S" curve signal being generated from the outputs of said light detector elements, first and second comparator means connected with said third signal receiving means, said first comparator means determining that said input "S" curve signal is less than a certain predetermined value and said second comparator means determining that said "S" curve signal is greater than a predetermined value, said first and second comparator means having their outputs connected together in a wired OR circuit producing a first logic output signal, third comparator means connected with said first signal receiving means for producing a second output logic signal indicative that said first analog detector element signal is within a predetermined range, a fourth comparator means connected with said second signal receiving means for determining that said second analog detector element signal is within a predetermined range, said fourth comparator means producing a third logic output signal, logic means for combining said first, second and third logic output signals to produce a fourth logic signal indicative that said objective lens is within the focusing region of the linear portion of said "S" curve signal, where said logic means requires said "S" curve input signal to be within predetermined limits and requires said first and second analog detector element signals to be within predetermined limits, and control means responsive to said fourth logic signal from said logic means for controlling said normal near focus system to be on when in focusing range.

6. The system, of claim 5 and further comprising
first timing means connected to receive a signal from said logic means and to provide an output signal to said control means for allowing said objective lens to be within a near focus condition for a predetermined time before activating said normal focusing control system.

7. The system of claim 6 and further comprising second timing means connected to receive a signal from said logic means and to provide an output signal to said control means for allowing said objective lens to be outside of a near focus condition for a predetermined time before deactivating said normal focusing control system.

8. The system of claim 5 wherein said logic means is comprised of first gate means receiving as a first input said first logic signal and as a second input said second logic signal, second gate means receiving as a first input said first logic signal and as a second input said third logic signal, third gate means receiving as a first input the output of said first gate means and as a second input the output of said second gate means, said third gate means producing as an output said fourth logic signal, wherein said first, second and third gates perform a logical NAND function.

* * * * *